United States Patent [19]

Dick

[11] 4,277,266
[45] Jul. 7, 1981

[54] ULTRA FILTRATION UNIT COMPRISING A TUBULAR FILTER ELEMENT

[75] Inventor: Gordon A. Dick, Bethany, Canada

[73] Assignee: Wheelabrator Corporation of Canada Limited, Ontario, Canada

[21] Appl. No.: 125,113

[22] Filed: Feb. 27, 1980

[51] Int. Cl.³ .................. B01D 46/04; B01D 50/00
[52] U.S. Cl. .......................... 55/381; 55/315; 55/334; 55/350; 55/524; 55/DIG. 45
[58] Field of Search .............. 55/262, 315, 334, 350, 55/278, 361, 381, 382, 485, 486, 488, 524, 528, DIG. 45; 210/505, 508

[56] References Cited

U.S. PATENT DOCUMENTS

| | | |
|---|---|---|
| 1,619,295 | 3/1927 | Gardner ............................ 55/315 |
| 2,148,708 | 2/1939 | Orr ................................. 210/505 |
| 2,316,721 | 4/1943 | Schwartz .......................... 210/505 |
| 2,882,997 | 4/1959 | Smith et al. ....................... 55/524 |
| 2,932,362 | 4/1960 | Roper .............................. 55/381 |
| 3,041,808 | 7/1962 | Snyder ............................. 55/262 |
| 3,375,640 | 4/1968 | Pelosi, Jr. ......................... 55/350 |
| 3,815,341 | 6/1974 | Hamano ........................... 55/528 |
| 3,936,284 | 2/1976 | Mason ............................. 55/485 |
| 3,977,847 | 8/1976 | Clark .............................. 55/477 |
| 4,164,400 | 8/1979 | Wald .............................. 55/382 |

FOREIGN PATENT DOCUMENTS

| | | | |
|---|---|---|---|
| 2754305 | 6/1978 | Fed. Rep. of Germany ......... | 210/508 |
| 1220888 | 1/1971 | United Kingdom .................. | 55/382 |

Primary Examiner—David L. Lacey
Attorney, Agent, or Firm—Staas & Halsey

[57] ABSTRACT

The invention relates to a tubular filter element for use in an ultra filtration plant. The element is in the form of a tube of woven fabric which is napped on its internal surface. A cellulose filter aid is deposited on the nap and the resulting filter element has a high collection efficiency and low filter drag making it particularly suitable for use in an air recirculation plant. The air is drawn from a working area and passed through a conventional primary collection unit and then through an ultra filtration unit containing an array of the filter elements. It is then sufficiently clean to be passed back to the working area, preferably through a HEPA filter, and this results in a substantial saving in heat energy which would otherwise be wasted.

13 Claims, 4 Drawing Figures

FIG. I

ULTRA FILTRATION UNIT COMPRISING A TUBULAR FILTER ELEMENT

The present invention relates to a filter element for use in an ultra filtration unit, which is particularly suitable for use in an air recirculation plant.

In recent years, there has been a greater public awareness of the need to preserve the environment and not to contaminate the air we breathe. In particular, in the mines, conventional filtration apparatus has been developed to remove airborne dust particles from the air which is exhausted to the atmosphere so as to reduce environmental pollution as far as possible. The apparatus for this purpose usually comprises a series of tube-like filter elements, each normally closed at one end and formed of cloth, through which the contaminated air is passed. The particles are filtered out as the air passes through the cloth. Every so often, when a large amount of particles has accumulated on the cloth, the cloth becomes clogged and the pressure drop across the filter elements rises substantially. At this point, the collected dust must be removed, either by backwashing the filter elements with air or by physically shaking them or both. Such filter elements, made of cloth tubes, will absorb particles quite effectively when the dust concentration is high and act as primary filters for cleaning air from an industrial area to a dust concentration at which it may safely be discharged to the atmosphere.

In certain specialized applications, it is necessary to provide super clean air which is normally considerably cleaner than the air we normally breathe. Whereas normal city air might have a dust content of 5.21 mg/1000 cu ft., super clean air may only have a dust content of 0.04 mg/1000 cu ft. For example, super clean air may be required for the ventilation, cooling or air conditioning of electrical control rooms, laboratories, precision manufacturing areas, electric motors, and transformers. Furthermore, air used in some processes for example, in an activated sludge sewage plant has to be very clean. Indeed, by super cleaning the air and reducing the dust content to 0.04 mg/1000 cu ft., it was found that the diffuser plates in a sewage plant, which cost almost one million dollars to replace, last approximately four times as long when super clean air is employed. There are many other applications in which such super clean air is either required or desirble and the process of providing such super clean air has come to be known as "Ultra Filtration". Known ultra filtration units draw their intake air directly from the atmosphere.

When ultra filtration first came into use, the filtering characteristics of conventional tubular filter bags were improved by coating their inner surfaces with finely ground asbestos particles. The asbestos particles effectively removed most of the dust from the air passing through but, unfortunately, the filter bags became clogged quickly owing to a cake of dust forming on the asbestos particles. This would lead to a considerable resistance to the air flow through the filter bags and a substantial increase in the amount of energy required to pass the air through the filter plant or, alternatively, reduce the effectiveness thereof. Unfortunately, because asbestos clings so tenaciously to the cloth of the filter elements, it was very difficult to remove by shaking or, indeed, by backwashing with air. U.S. Pat. No. 3,041,808 discloses a filter element in which a thin deposit of cellulose fibers is provided between the cloth of the filter bag and the asbestos particles. The presence of the cellulose fibers acts solely to permit the asbestos to be removed from the filter bag when it has become clogged with the cake of dust formed on its internal surface.

Recently, it has come to light that asbestos is environmentally unacceptable in that it is extremely hazardous to health. It is therefore an object of the invention to provide a filter element for use in an ultra filtration unit which does not require asbestos as a filter aid, but which nonetheless is capable of providing super clean air suitable for use in such applications as those mentioned above. It is also an object of the invention to provide an air recirculation plant capable of drawing dust-laden air from an industrial working area, cleaning the air to an acceptable level and returning the air to the working area.

Accordingly, a first aspect of the present invention provides, in an ultra filtration plant, a tubular filter element comprising a heavy cloth napped on its internal surface, and having a layer of filter aid material deposited on the nap.

Preferably, the napped cloth is heavy napped terylene and the filter aid material consists of cellulose fibers. It has been found that, by using cellulose fibers with heavy napped terylene, an extremely efficient ultra filtration filter can be provided which completely obviates the need for adding asbestos to the filter element, as was previously required, if ultra filtration was to be achieved, and which may last a year or more before it is necessary to replace the filter aid.

A second aspect of the invention provides an air treatment plant comprising: a primary filter for receiving dust-containing air drawn from a working area, said primary filter being adapted to remove the majority of dust particles from the air; an ultra-filtration unit arranged to draw air from said primary filter and reduce the dust-content still further to an environmentally acceptable level; and means for returning air from the ultra filtration unit to said working area.

The invention will now be described in more detail, by way of example only, with reference to the accompanying drawings in which.

Figure 1:
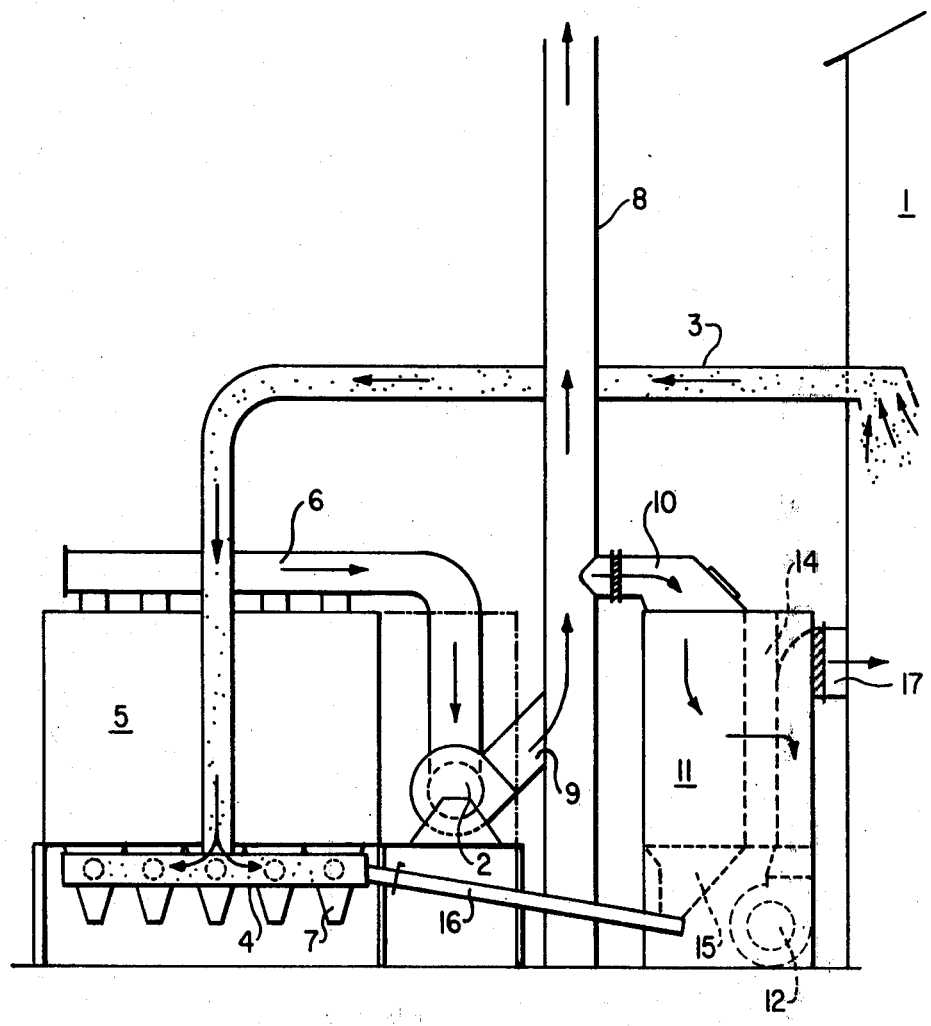
FIG. 1 is a diagrammatic view in side elevation of an air recirculation plant.

In the air recirculation plant shown in FIG. 1, air from an industrial working area is drawn by means of a fan 2 through an intake pipe 3 and passed to the base 4 of a collector unit 5. This comprises several banks of fabric tubular filter elements arranged in vertical arrays. The air flows up from the base 4 of the collector 5, through the inside of filter elements and out through their pervious walls. The filtered air is collected in a chamber surrounding the filter elements and exhausted through an air outlet 6. Every so often the accumulated dust particles are removed from the internal walls of the filter elements, either by shaking or by backwashing with air, and they are collected in hoppers.

The intake air from an industrial area might be expected to contain dust, for example a silica dust, at a concentration of 1 grain/cu ft. The fabric collector unit 5 will operate at a collection efficiency of 99.5% which means that its output air would have a dust concentration of 0.005 grains/cu ft or 11.5 mg/m$^3$. This dust level is within the environmental standards for acceptable ground level concentrations. That is, it would be environmentally acceptable to discharge air having such a dust concentration into the atmosphere at ground level. Fabric collector units 5 have been previously employed for this purpose, namely to clean air from an industrial area sufficiently for it to be directly discharged into the atmosphere. To this extent the fabric collector unit 5 is known and will not be described in further detail. In FIG. 1, the air exhausted in the outlet 6 is shown entering a stack 8 through a stack inlet 9 for emission into the atmosphere. Air having a dust concentration of 0.005 grains/cu ft. is in no way acceptable for recirculation to the working area. The air emitted through the stack into the atmosphere contains valuable heat energy which is wasted and which must be replaced when fresh air having a low level of respirable dust concentration is drawn into the working area.

In FIG. 1, a secondary air intake 10 is arranged in the stack 8 above the stack inlet 9. Warm filtered air having a dust concentration of 11.5 mg/m$^3$ is drawn off through the intake 10 and passed through an ultra filtration unit 11 by means of a second fan 12. The ultra filtration unit 11, which is shown in more detail in FIG. 2, also comprises banks of tubular filter elements 13 arranged in vertical arrays in a similar manner to the collection unit 5. The air is drawn in from the top of the filter elements and flows through their pervious walls into a surrounding chamber. Most of the remaining dust contained in the air is deposited on the internal walls of the tubular filter elements and can be removed from time to time by shaking or backwashing with air in a similar manner to the collection unit 5. For this purpose, the filter banks are provided with hoppers 15 in a similar manner to the collection unit 5 and a backwashing duct 16 connects the collection unit 5 and the ultra filtration unit 11. From the chamber surrounding the filter elements, the filtered air flows through an absolute filter 14 known as a HEPA filter for (High Efficiency Particulate Aerosols). The HEPA filter is widely acceptable as an absolute filter which guaranteed collection efficiencies as high as 99.97% on 0.3 microns particulates. The use of the HEPA filter 14 downstream of the ultra filtration unit 11 guarantees that almost any government standard will be met and that the dust concentration of the air passing through it will be quite acceptable to breathe. The air from the HEPA filter 14 is exhausted by the fan 12 through an outlet 17 into the working area.

Of course, from the environmental point of view, the air to be recirculated could be passed directly through the HEPA filter from the secondary air intake 10. Such air would have a dust concentration below the TLV* (below) and be acceptable to breathe directly. However, the relatively high dust concentration of the air in the stack (11.5 mgs./m$^3$) would clog the specialized HEPA filters so quickly that they would need replacing regularly, probably as often as once per month. HEPA filters use disposable glass fiber media and the cost of so replacing them would be prohibitively high. There would be no advantage to be gained by air recirculation. The object of the ultra filtration unit therefore is to reduce the dust concentration to an acceptable level below the TLV. The air from the ultra filtration unit has such a low level dust concentration that it does not clog the HEPA filter, the only purpose of which is to act as a safety device in the event of failure of the ultra filtration unit. If this allows too much dust to pass through, dust particles start to accumulate in the HEPA filter causing its drag-to-air flow to increase. This results in an increased pressure drop across the HEPA filter which can be detected and used to signal an alarm that the ultra filtration unit 11 is not working effectively.

*TLV denotes "Threshold Limit Value"

An ultra filtration unit, may have a collection efficiency as high as 99.8%. This means that for an intake dust concentration of 11.5 mg/m$^3$, the dust concentration in the output air would be 0.02 mg/m$^3$. Not only is this concentration about 1/5th the TLV for silica, it is also at such a level that the HEPA filter would be unaffected by this air passing through it, unless, of course, partial failure of the ultra filtration unit occurred. As mentioned in the introductory part of the specification, a conventional ultra filtration unit employs asbestos particles on the inner surface of the filter elements. The asbestos is introduced into the intake air flow when the unit is initially charged. After a certain period of time, the dust particles build up and the filter bags become so clogged that the pressure drop across them rises to such an extent that only a small volume of air can pass through them per unit time. At this moment, the asbestos is removed in the manner previously pointed out. If a cellulose pre-coat is used this is introduced in the intake air before the asbestos and facilitates the subsequent removal of the asbestos. Not only is the use of asbestos becoming environmentally unacceptable, it is important in the described recirculation plant to be able to achieve high flow rates with a maximum time between filter cleaning operations. The characteristics of the ultra filtration unit 11 will now be described in more detail.

In order to achieve a high filtration efficiency, there are a number of conflicting factors which have to be taken into consideration. Clearly, the volume of air that can be filtered per unit time depends on the flow rate through the filter elements. The flow rate will be greater the lower the resistance to flow for a given pressure drop across the filter element. However, generally, a low resistance to air flow means that the cloth must be coarsely woven and a small amount of filter aid material must be coated thereon. This in turn means that too many particles will pass through the filter bag and there will be a relatively low filtration efficiency. On the other hand, a high filtration efficiency can be achieved by using a finely woven cloth with a substantial amount of filtered material. Of course, this means that either the flow rate will be reduced or, alternatively, the pressure drop must be increased. In either case, this will require the expenditure of more energy to filter the same amount of air. The pressure drop $\Delta p$ across a filter bag is given approximately be the expression:

$$\Delta p = (KLTV^2/7000)$$

where

K is a constant dependent upon the properties of the filter element and the dust being filtered and is known as the K factor or specific resistivity constant L is the amount of dust collected in the filter element in grains/cu ft.

T is the time in seconds, and

V is the velocity of the air flow in feet per minute.

Generally, cloths which provide a good ultra filtration collection efficiency, that is they remove a very high percentage of air-borne particles, have high K factors. Consequently, in order to maintain an adequate flow across them, they require the expenditure of a considerable amount of energy owing to the high pressure drop across them and this results in an increase in the operating cost. With an asbestos coated filter bag, the filter drag rises to such a value, after a period of for example, three or four months, that the pressure drop $\Delta p$ across the filter element is so high and the air flow through the filter element is so low that all the filter aid material must be removed and the filter elements have to be recoated.

The drag through a conventional asbestos coated filter element can be reduced by simply eliminating the asbestos. It has been found that the cellulose pre-coat, which is primarily intended to allow the asbestos to be easily removed during backwashing, does provide some degree of filtration. However, the filtration efficiency is not high enough for use in the recirculation plant shown in FIG. 1.

Figure 2:
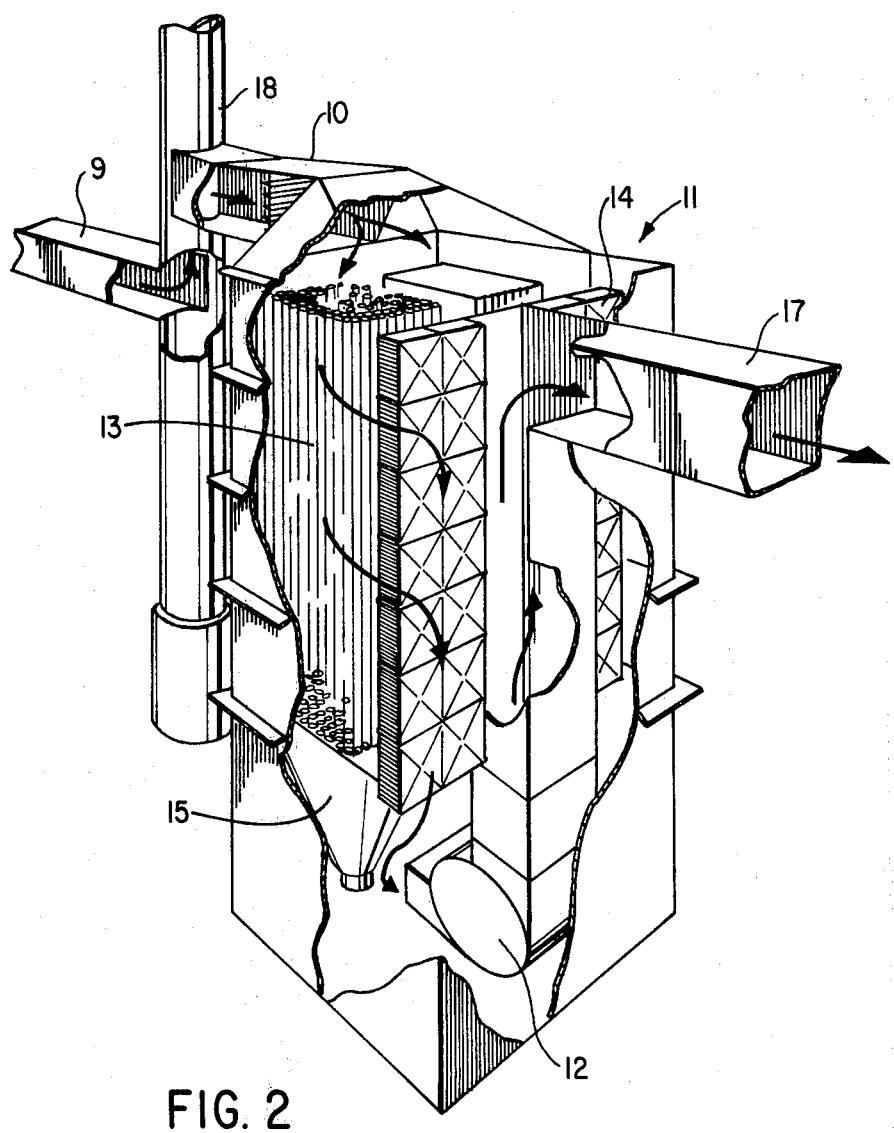
FIG. 2 is a perspective view of an ultra filtration unit forming part of the recirculation plant.
Figure 3:
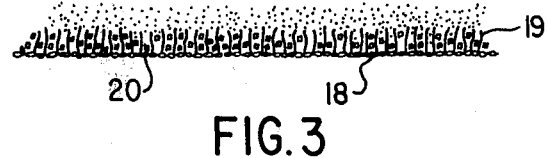
FIG. 3 is a sectional view of part of the wall of a filter element of the ultra filtration unit.

In the ultra filtration plant shown in FIGS. 1 and 2, the filter elements are made of a coarsely woven terylene cloth which has been heavily napped on one surface. As is well known, napping is a process whereby the individual fibers are raised from the threads of a woven fabric by brushing the woven fabric. For example, a blanket is a good example of a napped cloth. Only a single coat of cellulose filter aid, preferably SOLKA-FLOC (a trade mark) BW 40 is then deposited on the coarsely woven napped cloth by introducing it into the air intake when the unit is first charged. As shown in FIG. 3 which is a section through a part of the wall of one of the filter elements, the material comprises a coarsely woven layer 18 of terylene fabric. The terylene has been napped on one surface to provide a nap 19 consisting of small individual fibers projection from the main cloth layer 18. In use, the cellulose filter aid is deposited on the inner surface of the filter elements, i.e. that provided with the nap 19, and, as shown in FIG. 3, the cellulose 20 becomes entrapped in the fibers of the nap. A thin layer (not shown) of filter aid may also form on top of the nap 19, although most of the filter aid penetrates within the nap. In use, it has been found that the combination of the nap 19 and cellulose filter aid material 20 gives an extremely good ultra filtration efficiency, that is virtually all air-borne particles are removed from the filtered air, while at the same time having a relatively low K factor. This means that, for the expenditure of a minimum amount of energy, a high flow rate through the filter can be achieved at a high collection efficiency. In addition, unlike previous filters, the filter elements do not tend to clog quickly and, indeed, have a lifetime between recoating operations approximately four times greater than was the case with an asbestos filter aid. Of course, these advantages are quite separate from the environmental desirability of eliminating the use of asbestos which is extremely hazardous to health.

When, finally, owing to the filter elements becoming clogged, the pressure drop across them increases to such an extent that it is no longer economically feasible to continue operation, it has proved to be a relatively simple matter to remove the filter aid material from the napped cloth. They can be shaken if desired, although it has been found that the filter aid material can be readily removed by simply backwashing the elements, i.e. simply by reversing the air flow through them. This reverse air flow removes the cellulose filter aid from the nap, together with the collected dust particles, and deposits it in the hopper 15 of the unit 11. The spent filter aid material and dust can then be removed through an opening in the lower part of the housing. Of course, if desired, the spent filter aid material also can be removed by agitation.

Figure 4:
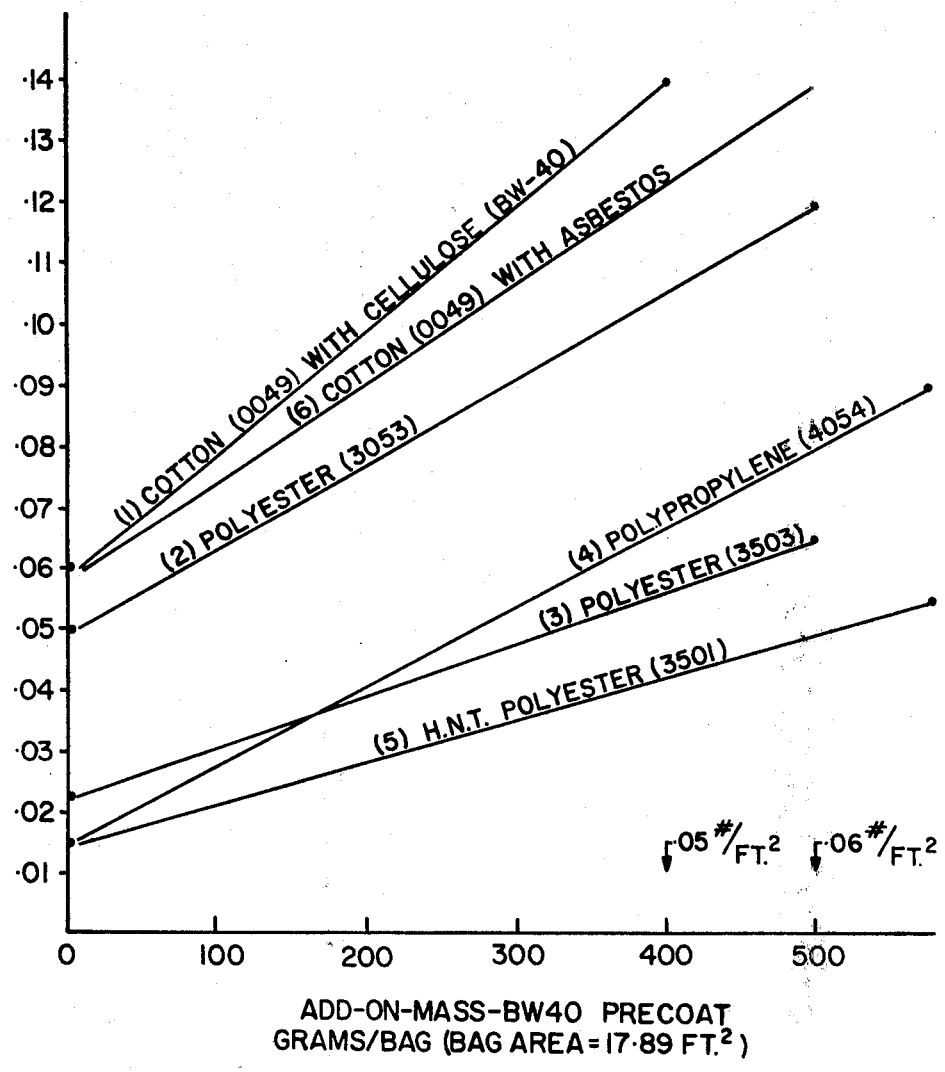
FIG. 4 is a diagram showing the drag versus the mass of dust deposited for various fabrics.

By way of illustration, reference will be made to FIG. 4. Air was passed through a tubular filter element having an active surface area of 17.89 sq ft. Various amounts of BW40 SOLKA-FLOC (a trade mark) filter aid were introduced into the intake air and deposited on the internal wall of the element. FIG. 4 shows the filter drag plotted against the amount of added filter aid material for various fabrics. The drag is measured in terms of the ratio of the pressure drop $\Delta p$ across the bags to the velocity V of the air flowing through the bags. The add on mass is the amount of filter aid carried by the bags at the time the measurement is taken. Line 1 represents a Barrday style 0049 cotton fabric having various amounts of filter aid deposited on its surface. Line 2 represents a Barrday style 3053 spun polyester fabric with various masses of a filter aid. Line 3 represents a style 3503 spun polyester fabric. Line 4 represents a style 4054 spun polypropylene fabric with a filter aid deposited on its surface, and line 5 represents a heavy napped terylene polyester fabric (Barrday style 3501).*
From the diagram, it can be seen quite readily that the drag produced by the heavy napped terylene polyester fabric is substantially less than that of the other fabrics, particularly cotton with asbestos which is conventionally used for ultra filtration elements. This reduced drag enables the great saving in energy, and therefore cost, to be achieved.

*Line 6 represents a style 0049 fabric with asbestos.

The efficiency of dust collection of the style 3501 heavy nap terylene fabric was compared with a cotton fabric (style 0049) having an asbestos filter aid. This was carried out by passing known quantities of test dust mixed in a feding hopper through individual filter bags at a constant rate and the total discharge was monitored by passing the discharged air through a high volume sample membrane. Any dust passing through the filter is collected on this membrane which is weighed before and after the test. The cotton fabric had a collection efficiency of 99.9971 whereas the heavy nap terylene filter aid had an efficiency of 99.9935 which is quite acceptable. However, the much lower drag of the 3501 fabric compared to the 0049 means that economically, great savings can be achieved and a much larger volume of air can be filtered in the same amount of time with the consumption of less energy. The full test results for the two fabrics are set out below:

| | |
|---|---|
| FABRIC UNDER STUDY: | Barrday 3501 (H.N.T.) - BW40 Filter Aid |
| TEST DUST: | Minex 7 (Mean particle size 5 microns) |
| | Nepheline Syenite |
| FILTER BAG STYLE: | 5" × 168" Strap top |
| FILTRATION EFFICIENCY EVALUATION | |
| FILTRATION TIME: | 53 minutes |
| TOTAL GAS FILTERED: | 53 × 10 × 17.89 = 9482 ft$^3$ |
| TOTAL PARTICULATE FEED TO THE FEED HOPPER: | 18,550 grains |

| | -continued |
|---|---|
| ISOLATED CELL DUST LOADING: | Assume 20% of feed rate |
| FILTRATION VELOCITY (A/C ratio) FOR ISOLATED CELL - | 10 Ft.P.M. |
| MAXIMUM DIFFERENTIAL PRESSURE ACROSS FILTER BAG (Dust-on-Fabric) | = 4.9" water gauge (w.g.) |
| MINIMUM DIFFERENTIAL PRESSURE ACROSS FILTER BAG (Dust-on-Fabric) | = 0.7" w.g. |
| NUMBER OF CYCLES: | one |
| FINAL CYCLE ADD-ON DUST (i.e. filter aid dust adhering to filter after completion of test | = Est. .07#/ft$^2$ filter aid + 0.03 #/ft$^2$ dust = 0.1 lbs/ft$^2$ |
| ESTIMATED ADD-ON-DUST FOR RUN: | 0.3 #/ft$^2$ fabric |
| SAMPLER FILTER WEIGHT (AFTER RUN) - | 4.2783 grams |
| SAMPLER FILTER WEIGHT (BEFORE RUN) - | 4.2628 grams |
| COLLECTED MASS ON SAMPLER FILTER - | 0.0155 grams = .2392 grains) |
| COLLECTION EFFICIENCY: | Based on 20% feed rate = 99.9935% |
| | Based on 40% feed rate = 99.9968% |
| PENETRATION: | For 20% feed rate = .000065 |
| | For 40% feed rate = .000032 |

| | |
|---|---|
| FABRIC UNDER STUDY: | Barrday 0049 (Cotton) - Asbestos Filter aid |
| TEST DUST: | Minex 7 Nepheline Syenite |
| FILTER BAG STYLE: | 5" × 168" strap top |
| CLEANING MODE & CYCLE: | none |
| FILTRATION EFFICIENCY EVALUATION | |
| FILTRATION TIME: | 33 minutes |
| TOTAL GAS FILTERED: | 33 × 10 × 17.89 = 5904 ft$^3$ |
| TOTAL PARTICULATE FEED TO THE FEED HOPPER: | 11,550 grains |
| ISOLATED CELL DUST LOADING: | Assume 20% of feed |
| FILTRATION VELOCITY (A/C RATIO) For Isolated Cell - | 10 Ft.P.M. |
| MAXIMUM DIFFERENTIAL PRESSURE (Dust-on-Fabric) - | 5.2" w.g. |
| MINIMUM DIFFERENTIAL PRESSURE (Dust-on-Fabric) - | 1.4" w.g. |
| NUMBER OF CYCLES: | one |
| FINAL CYCLE ADD-ON-DUST - | Est. .06 #/ft$^2$ Filter Aid + .013 #/ft$^2$ dust |
| ESTIMATED ADD-ON-DUST FOR RUN - | .019 #/ft$^2$ fabric |
| SAMPLER FILTER WEIGHT (AFTER RUN) - | 4.2501 grams |
| SAMPLER FILTER WEIGHT (BEFORE RUN) - | 4.2458 grams |
| COLLECTED MASS ON SAMPLER FILTER - | .0043 grams = (.0664 grains) |
| COLLECTION EFFICIENCY: | based on 20% feed rate = 99.9971% |
| | based on 40% feed rate = 99.9985% |
| PENETRATION: | for 20% feed rate - .000029 |
| | for 40% feed rate - .000015 |

| | |
|---|---|
| FABRIC UNDER STUDY: | Barrday 0049 (Cotton) - BW40 Filter Aid |
| TEST DUST: | Minex 7 Nepheline Syenite |
| FILTER BAG STYLE: | 5" × 168" Strap Top |
| CLEANING MODE & CYCLE: | none |
| FILTRATION EFFICIENCY EVALUATION (Residual Established) | |
| FILTRATION TIME: | 38 minutes |
| TOTAL GAS FILTERED: | 38 × 10 × 17.98 = 6798 ft$^3$ |
| TOTAL PARTICULATE FEED TO THE FEED HOPPER: | 1.96 Gr/ft$^3$ = 13,300 grains |
| ISOLATED CELL DUST LOADING: | Assume 20% of feed |
| FILTRATION VELOCITY (A/C RATIO) For Isolated Cell - | 10 Ft.P.M. |
| MAXIMUM DIFFERENTIAL PRESSURE ACROSS FILTER BAG (Dust-on-Fabric) | 5.5" w.g. |
| MINIMUM DIFFERENTIAL PRESSURE ACROSS FILTER BAG (Dust-on-Fabric) | 1.7" w.g. |
| NUMBER OF CYCLES - | one |
| FINAL CYCLE ADD-ON-DUST - | Est. .06 #/ft$^2$ Filter Aid + .021 #/ft$^2$ dust |
| ESTIMATED ADD-ON-DUST FOR RUN - | .021 #/ft$^2$ fabric |
| SAMPLER FILTER WEIGHT (AFTER RUN) - | 4.2848 grams |
| SAMPLER FILTER WEIGHT (BEFORE RUN) - | 4.2826 grams |
| COLLECTED MASS ON SAMPLER FILTER - | .0022 grams = .034 grains |
| COLLECTION EFFICIENCY - | based on 20% feed rate = 99.9987% |
| | based on 40% feed rate - 99.9993% |
| PENETRATION: | For 20% feed rate = .000013 |
| | For 40% feed rate = .000007 |

Thus, the preferred form of the invention uses a heavy napped terylene fabric (Barrday style 3501) with a BW40 SOLKA-FLOC filter aid at a mass deposit of approximately 0.07 lbs of filter aid per square foot of fabric. This has a high collection efficiency and low filter drag. However, a fabric other than heavy napped terylene can be used, provided it is napped and relatively coarsely woven. The filter aid is preferably cellulose, and preferably at least 99.5% cellulose derived from wood pulp, but other suitable aids may be used provided they are of such a nature that they will become embedded in the nap of the fabric. In effect, the nap means that a coarser fabric can be used for ultra filtration than would otherwise be the case. The fibers of the nap form a fine bed which holds the filter aid material over a relatively thick layer, instead of allowing it to be compacted against the cloth as is the case with an unnapped fabric. Thus, the active part of the filter has a relatively open structure and the resistance to air flow is quite low. Nonetheless, because of its thickness, the statistical chances of a particle of dust passing through the filter striking a particle of filter aid material are very high and this, it is believed, is the reason for the coated nap filter having a high efficiency.

A filter element made as described from heavy napped terylene is extremely effective in the described air recirculation plant. The energy requirements for the ultra filtration unit are sufficiently low for the recirculation of air to be rendered highly economical. Furthermore, the collection efficiency of heavy napped terylene with SOKA-FLOC (a trade mark) filter aid (99.99%) is more than adequate to provide a dust concentration which is below the TLV when fed with air from the primary collection unit 5.

Brown Company, SOLKA-FLOC (a trade mark) filter aid #BW 40 has the following characteristics:

| | |
|---|---|
| color - | white |
| brightness - | 81 |
| approximate average length (microns) | 80 |
| approximate average thickness (microns) | 16 |
| approximate screen analysis | |
| % on 40 mesh: | 0.8-1 |
| % through 100 mesh: | 83-90 |
| % through 200 mesh: | 25 |
| filter cake density (lbs/cu ft) - | 11-13 |
| approximate moisture (%) | 5-7 |
| Iron (%) | .0150 |
| Lignin (%) | 0.2-0.4 |
| Sulphur (%) | .0060 |
| Ether solubles (%) | 0.2 |
| Copper (%) | .0006 |
| Viscosity (cps) | 18 |
| Pentosans (%) | 2.4 |
| Barrday style S-3501 fabric has the following characteristics: | |
| WARP - | SPUN 2 RUN (Wollen System) |
| FILL - | SPUN 2 RUN (Wollen System) |
| COUNT | 38 × 27 |
| WEIGHT | 14 oz. per sq. yd. |
| PERMEABILITY | 50-60 ft³/min at ½" w.g. |
| WEAVE | 2 × 2 twill |
| FINISH - | HEAVY NAP (to the dust). |

The embodiments of the invention in which an exclusive property or privilege is claimed are defined as follows:

1. In an ultra filtration unit comprising an inlet and an outlet for the flow of gas therethrough, a filter element comprising a tubular wall of cloth napped on its internal surface and having a layer of filter aid material deposited thereon so as to penetrate the nap, said filter element having a hollow interior in communication with said inlet and an exterior in communication with said outlet such that said gas flowing through said ultra filtration unit passes through said cloth wall and said layer of filter aid material to be filtered thereby.

2. An ultra filtration unit according to claim 1, wherein the cloth is woven.

3. An ultra filtration unit according to claim 2, wherein the cloth is heavily napped 4. An ultra filtration unit according to claim 3, wherein the filter aid material is cellulose.

5. An ultra filtration unit according to claim 2, wherein the cloth is heavily napped terylene.

6. An ultra filtration unit according to claim 5, wherein the filter aid material is cellulose.

7. An ultra filtration unit according to claim 5, wherein the filter aid material is at least 99.5% cellulose derived from wood pulp.

8. An ultra filtration unit according to claim 5, wherein the cloth has the following approximate characteristics:
 weight—14 oz per sq. yd.
 permeability 50-60 C.FM @ ½" w.g.
 weave—2×2 twill
 Finish—Heavy nap.

9. An ultra filtration unit according to claim 8, wherein the cloth has the following additional characteristics:
 wrap—spun 2 run (Wollen System)
 fill—spun 2 run (Wollen System)
 Count—38×27.

10. An ultra filtration unit according to claim 1, wherein the filter aid material is at least 99.5% cellulose derived from wood pulp.

11. An ultra filtration unit according to claim 1, wherein the filter aid material is at least 99.5% cellulose derived from wood pulp and has the following characteristics:
 average length (microns) 80
 thickness (microns) 16
 approximate screen analysis, percentage on 40 mesh 0.8-1
 percentage through 100 mesh 83-90
 percentage through 200 mesh 25
 filter cake density (lbs/ft³) 11 to 13
 approximate moisture (%) 5-7.

12. An ultra filtration unit according to claim 11, wherein the cloth is heavily napped terylene.

13. An ultra filtration unit according to claim 12, wherein the cloth has the following approximate characteristics:
 weight—14 oz per sq. yd.
 permeability 50-60 C.FM @ ½" w.g.
 weave—2×2 twill
 finish—heavy nap.

* * * * *